United States Patent
Hauman et al.

(10) Patent No.: US 12,216,686 B1
(45) Date of Patent: Feb. 4, 2025

(54) MACHINE LEARNING TECHNOLOGIES FOR PREDICTING RESULTS OF CABLE FIRE TESTS

(71) Applicant: UL LLC, Northbrook, IL (US)

(72) Inventors: Christopher Hauman, Mount Prospect, IL (US); Anthony Tassone, Melville, NY (US); Jiyuan Kang, Highland Park, IL (US)

(73) Assignee: UL LLC, Northbrook, IL (US)

( * ) Notice: Subject to any disclaimer, the term of this patent is extended or adjusted under 35 U.S.C. 154(b) by 0 days.

(21) Appl. No.: 18/417,490

(22) Filed: Jan. 19, 2024

(51) Int. Cl.
*G06F 16/28* (2019.01)

(52) U.S. Cl.
CPC .................................. *G06F 16/285* (2019.01)

(58) Field of Classification Search
CPC ..... G06F 16/285; G06F 16/284; G06F 16/288
See application file for complete search history.

(56) References Cited

U.S. PATENT DOCUMENTS

| | | | |
|---|---|---|---|
| 6,043,312 | A | 3/2000 | Fagher et al. |
| 2008/0231307 | A1 | 9/2008 | Bickford et al. |
| 2009/0022462 | A1 | 1/2009 | Papazoglou et al. |
| 2015/0294246 | A1 | 10/2015 | Guven Kaya et al. |
| 2017/0286839 | A1 | 10/2017 | Parker |
| 2017/0308802 | A1 | 10/2017 | Ramsøy et al. |
| 2018/0001184 | A1 | 1/2018 | Tran et al. |
| 2019/0147371 | A1 | 5/2019 | Deo et al. |
| 2019/0370684 | A1 | 12/2019 | Gunes et al. |
| 2020/0115066 | A1 | 4/2020 | De Munck et al. |
| 2020/0117580 | A1 | 4/2020 | Lekivetz et al. |
| 2020/0348646 | A1 | 11/2020 | Coffman et al. |

(Continued)

FOREIGN PATENT DOCUMENTS

| | | |
|---|---|---|
| CN | 204255891 U | 4/2015 |
| CN | 105301173 A | 2/2016 |

(Continued)

OTHER PUBLICATIONS

Cone Calorimeter, The National Institute of Standards and Technology (NIST), downloaded from the Internet: <https://www.nist.gov/laboratories/tools-instruments/cone-calorimeter> Jun. 5, 2014.

(Continued)

*Primary Examiner* — Loc Tran
(74) *Attorney, Agent, or Firm* — MARSHALL, GERSTEIN & BORUN LLP

(57) ABSTRACT

Systems and methods for using machine learning models to predict an outcome of a product test are described. According to certain aspects, an electronic device may calculate, based on a received set of small-scale results as a first input to a first machine learning model of a plurality of machine learning models, a first result predicting an outcome of the product tested according to the large-scale product test. The electronic device may then calculate, based on the set of small-scale results as a second input to at least one second machine learning model of the plurality of machine learning models, a second result predicting the outcome of the product tested according to the large-scale product test. The electronic device may then predict an outcome of the large-scale product test based at least on the first result and the second result.

11 Claims, 9 Drawing Sheets

(56) References Cited

U.S. PATENT DOCUMENTS

| | | | |
|---|---|---|---|
| 2020/0387148 A1 | 12/2020 | Ghosh et al. | |
| 2021/0209488 A1 | 7/2021 | Li et al. | |
| 2021/0334699 A1* | 10/2021 | Tabaddor | G06Q 30/018 |
| 2023/0143428 A1* | 5/2023 | Coppock | C08J 9/145 |
| | | | 521/145 |

FOREIGN PATENT DOCUMENTS

| | | |
|---|---|---|
| CN | 107817170 A | 3/2018 |
| CN | 207067095 U | 3/2018 |
| CN | 207528672 U | 6/2018 |
| CN | 106057053 B | 1/2019 |
| CN | 208526167 U | 2/2019 |
| CN | 110009052 A | 7/2019 |
| CN | 110009241 A | 7/2019 |
| CN | 110322769 A | 10/2019 |
| KR | 10-2006-0095671 A | 9/2006 |
| KR | 2019/0047809 A | 5/2019 |
| KR | 2019/0060547 A | 6/2019 |

OTHER PUBLICATIONS

Gallo et al., Assessing the reaction to fire of cables by a new bench-scale method, Fire and Materials, vol. 41, Issue 6, Summary only (Dec. 12, 2016).
IEEE Guide for Fire Hazard Assessment of Electrical Insulating Materials in Electrical Power Systems, IEEE Std 1221-1993, 32 pp. (1993).
IEEE Standard for the Testing, Design, Installation, and Maintenance of Electrical Resistance Heat Tracing for Industrial Applications, IEEE Std 515-1997, 79 pp (1997).
International Application No. PCT/US2021/026830, International Search Report and Written Opinion, mailed Jul. 23, 2021.
Khan et al., Screening of plenum cables using a small-scale fire test protocol, Fire and Materials, 36:65-76 (2006).
Magalie et al., Fire behaviour of electrical cables in cone calorimeter: Influence of cables structure and layout, Fire Safety Journal 99:12-21 (2018).
Nam et al., A new intermediate-scale fire test for evaluating building material flammability, Journal of Fire Protection Engineering, vol. 19, pp. 157-176 (Aug. 2009).

* cited by examiner

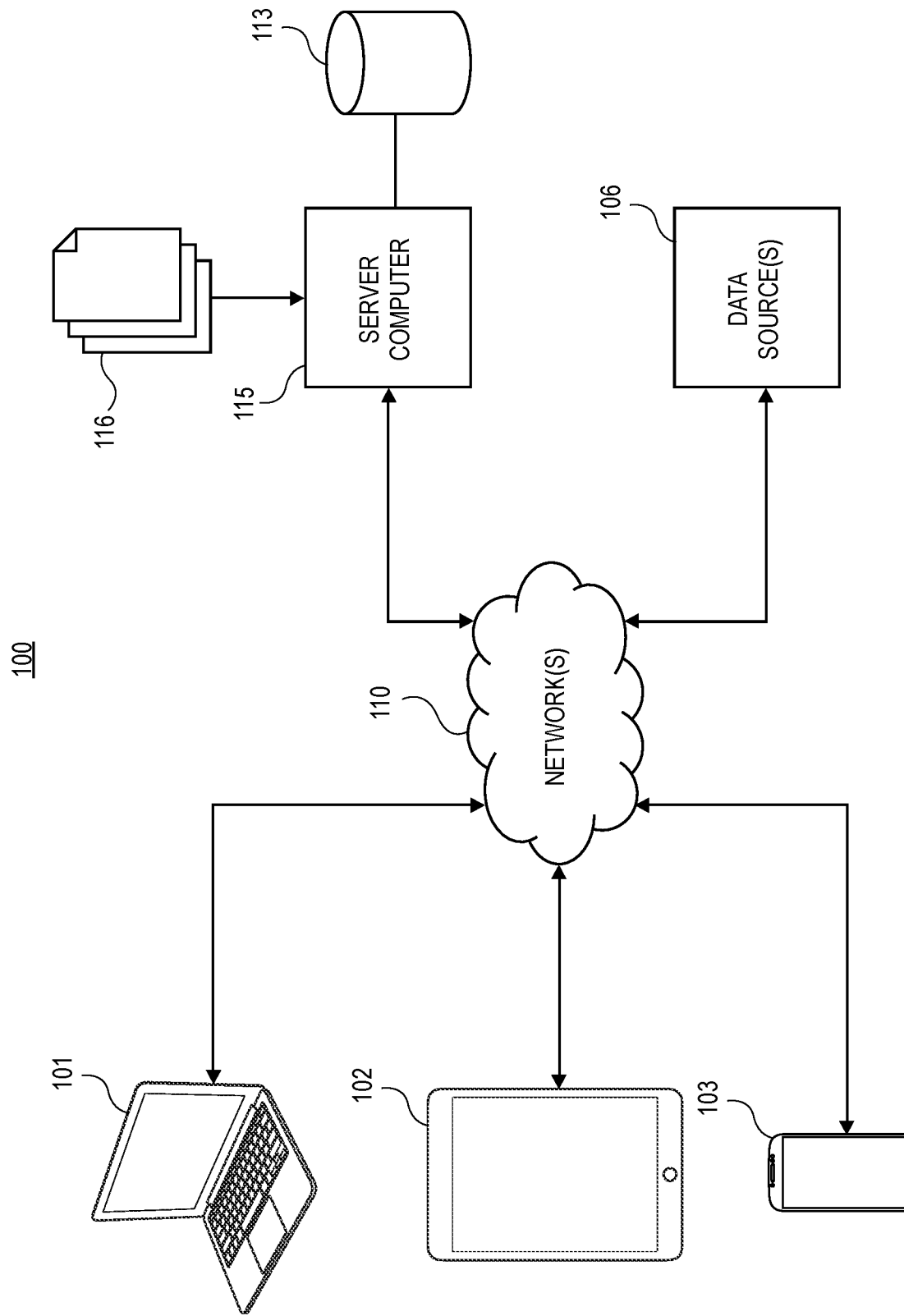

MACHINE LEARNING TECHNOLOGIES FOR PREDICTING RESULTS OF CABLE FIRE TESTS

FIELD

The present disclosure is directed to using machine learning to create models for product tests. More particularly, the present disclosure is directed to platforms and technologies for predicting an outcome of a product test using a plurality of machine learning models trained on real-world testing data.

BACKGROUND

Cables used in various applications, projects, building constructions, and the like are potentially subjected to potential hazards. For example, cables are frequently installed and utilized in buildings for various purposes, and may be exposed to fire events in the buildings. In a specific instance, communication cables are used to transmit information between systems such as servers, personal computers, and other hardware, but may also add a risk by providing a path along which fire can travel. As such, certain types of products are subject to different requirements and standards, depending on the applicable jurisdiction. For example, the Construction Project Regulation (CPR) requires cables to be subjected to the test method described in EN 50399, the Test for Flame Spread of Vertically Mounted Bunched Wires or Cables. This standard improves fire safety in buildings by presenting a test procedure to evaluate the potential for smoke emission and flame spread along cables and wires housed between walls or in other such vertical spaces within a building. The EN 50399 test method evaluates cables for adequate fire-resistant and low smoke-producing characteristics, and in particular determines the resistance categories for a cable based on a maximum fire spread (FS), a total heat release (THR), a peak heat release rate (HRR), and a fire growth rate index (FIGRA).

Certain product tests require that the physical specimens be tested to meet certain criteria. For example, EN 50399 requires a number of cable lengths 3.5 meters (approximately 11.5 feet) long in the vertical orientation. The number of cable lengths to be laid in the test chamber is determined by the cable diameter and/or size of the ladder. When a cable manufacturer intends to have a cable certified for the European market, the cable manufacturer must produce or manufacture a sufficient length of representative cable to be tested in accordance with EN 50399. In some situations, the cable manufacturer may want to provide more than one type of cable to the market (or may otherwise not know into which category each one of multiple cables may fall), in which case the cable manufacturer must produce or manufacture multiple cable specimens. However, producing or manufacturing cables of such length, or generally complying with requirements of large-scale product tests such as EN50399, can be costly and cumbersome. Additionally, the lengths needed for testing of the cables may be a disincentive for manufacturers to innovate new products.

Accordingly, there is an opportunity for systems and methods to alleviate these existing drawbacks of large-scale product tests.

SUMMARY

In an embodiment, a computer-implemented method for predicting an outcome of a large-scale product test is provided. The method may include: receiving, by one or more processors, a set of small-scale results of a product tested according to a small-scale product test representative of the large-scale product test; calculating, by the one or more processors and based on the set of small-scale results as a first input to a first machine learning model of a plurality of machine learning models, a first result predicting an outcome of the product tested according to the large-scale product test, wherein calculating the first result includes: determining, by the one or more processors, a first classification for the product, and calculating, by the one or more processors, a confidence value for the first classification; calculating, by the one or more processors and based on the set of small-scale results as a second input to at least one second machine learning model of the plurality of machine learning models, a second result predicting the outcome of the product tested according to the large-scale product test, wherein calculating the second result includes: determining, by the one or more processors, a second classification for the product; and predicting, by the one or more processors, an outcome of the large-scale product test based at least on the first result and the second result.

In another embodiment, a system for predicting an outcome of a large-scale product test is provided. The system may include: one or more processors; a memory storing data associated with a plurality of machine learning models; and a non-transitory computer-readable memory interfaced with the one or more processors, and storing instructions thereon that, when executed by the one or more processors, cause the one or more processors to: receive a set of small-scale results of a product tested according to a small-scale product test representative of the large-scale product test, calculate, based on the set of small-scale results as a first input to a first machine learning model of a plurality of machine learning models, a first result predicting an outcome of the product tested according to the large-scale product test, wherein calculating the first result includes: determining a first classification for the product, and calculating a confidence value for the first classification, calculate, based on the set of small-scale results as a second input to at least one second machine learning model of the plurality of machine learning models, a second result predicting the outcome of the product tested according to the large-scale product test, wherein calculating the second result includes: determining a second classification for the product, and predict an outcome of the large-scale product test based at least on the first classification, the confidence value, and the second classification.

In a further embodiment, a non-transitory computer-readable storage medium is provided. The non-transitory computer-readable storage medium may store one or more instructions for predicting the outcome of a large-scale product test that, when executed by one or more processors, cause the one or more processors to: receive a set of small-scale results of a product tested according to a small-scale product test representative of the large-scale product test; calculate, based on the set of small-scale results as a first input to a first machine learning model of a plurality of machine learning models, a first result predicting an outcome of the product tested according to the large-scale product test, wherein calculating the first result includes: determining a first classification for the product, and calculating a confidence value for the first classification; calculate, based on the set of small-scale results as a second input to at least one second machine learning model of the plurality of machine learning models, a second result predicting the outcome of the product tested according to the large-scale product test, wherein calculating the second result includes: determining a second classification for the product; and predict an outcome of the large-scale product test based at least on the first classification, the confidence value, and the second classification.

BRIEF DESCRIPTION OF THE FIGURES

FIG. 1A depicts an overview of components and entities associated with the systems and methods, in accordance with some embodiments.

DETAILED DESCRIPTION

Figure 1B:
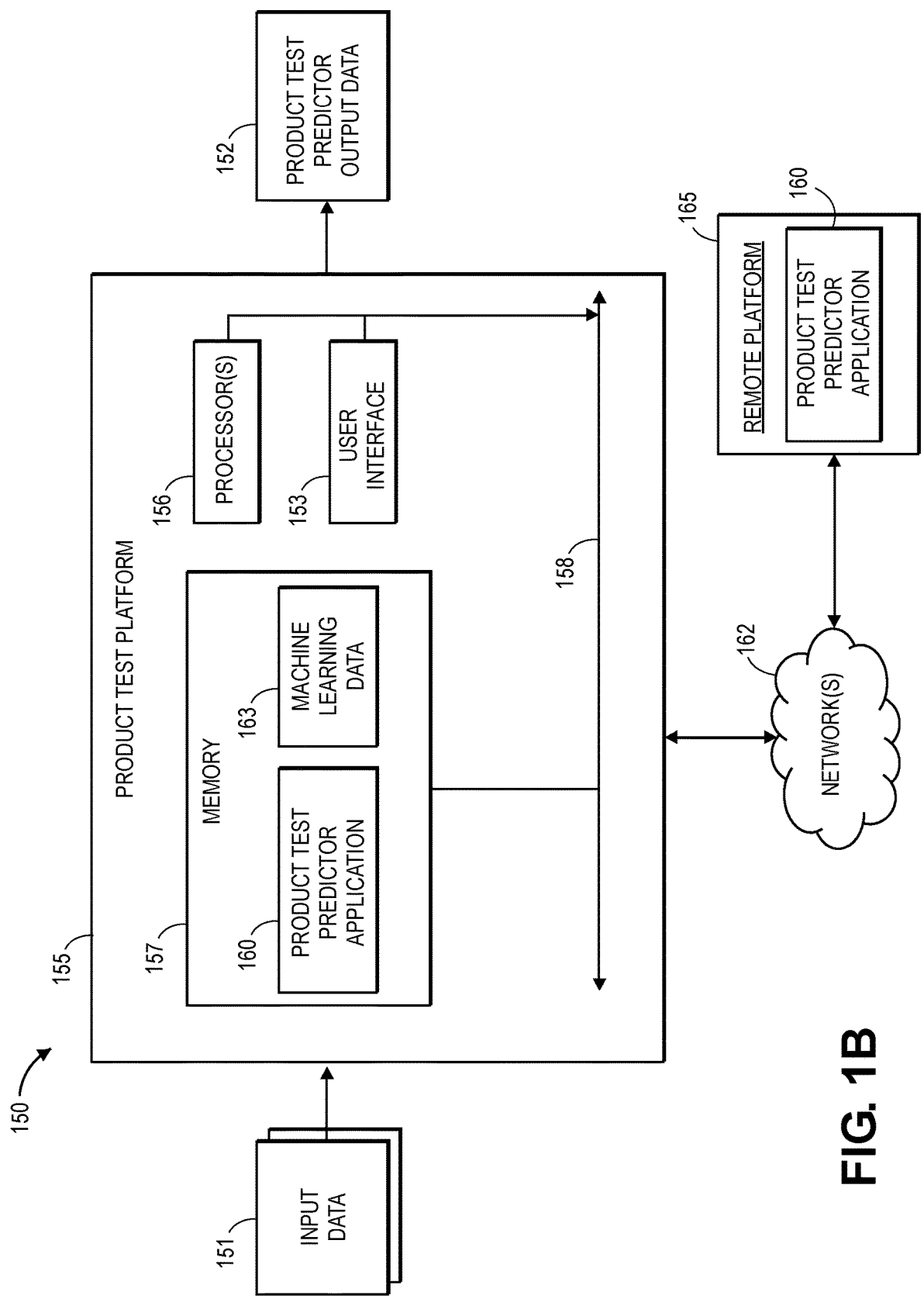
FIG. 1B depicts an overview of certain components configured to facilitate the systems and methods, in accordance with some embodiments.

The present embodiments may relate to, inter alia, platforms and technologies for predicting a result of a product test. According to certain aspects, an electronic device uses a set of small-scale results for a product tested according to a small-scale product test (e.g., representative of a large-scale product test) as an input to a plurality of machine learning models. The machine learning models may be different models and may analyze the input data (e.g., the small-scale results) differently to predict the result of the large-scale product test. Additionally, an electronic device may train any or all of the machine learning models using various machine learning techniques as appropriate for the particular model.

In particular, systems and methods may initially use various machine learning techniques to train a machine learning model(s) (or more generally, a mathematical model(s)) using a training dataset, where the training dataset may include a set of results of (i) a set of products tested according to a first product test, and (ii) a set of additional products tested according to a second product test. The systems and methods may then store the trained machine learning model(s) for subsequent use. As such, the systems and methods may use the machine learning model(s) to predict in which category a sample of a product would fall and/or whether a product would pass a given product test (or otherwise be certified according to the product test).

The systems and methods therefore offer numerous benefits. In particular, the use of various machine learning techniques enables the systems and methods to accurately, more consistently, and dynamically predict product compliance with certain product tests and/or standards. This would be particularly beneficial in circumstances in which a given product test requires a large product sample (or otherwise a product sample that is difficult and/or costly to manufacture), where the systems and methods may use results from a test on a smaller or less cumbersome product sample to assess whether a product would be compliant with the requirements of various product categories and/or of the test as a whole. Thus, the systems and methods could eliminate product constructions that do not comply, thereby reducing costs associated with ensuring that products comply with certain product tests. Moreover, by using multiple machine learning models to make a prediction and/or by training the machine learning models using the ultimate outcome, the overall functionality of the system is improved. It should be appreciated that additional benefits are envisioned.

Furthermore, by using multiple model types (e.g., a classification model and regression model) in combination with a test prediction module, a computing device implementing the instant techniques may offer additional improvements through enhanced accuracy and certainty regarding results. For example, by taking in determinations made by multiple model types to make a prediction, a computing device implementing the instant techniques is able to utilize multiple methods to ensure consistent results, overall improving the output of the computing device.

Whereas conventional techniques rely on performing a large scale test using a large scale product quantity, the instant techniques may reduce or eliminate costs and improve overall functionality of a computing system implementing the instant techniques by using machine learning models to model large-scale product tests. For example, the instant techniques may improve accuracy by analyzing vast quantities of data with high precision, allowing for more accurate predictions and assessments of product performance compared to conventional techniques. Similarly, using a machine learning model may allow a computing system implementing the instant techniques to process data more quickly, reducing the time required for testing and analysis.

Similarly, machine learning techniques may provide improvements over conventional techniques through ongoing improvements and modifications. For example, by implementing the instant techniques, a computing device may allow for greater customization for particular product types or application, allowing for more precise testing and/or analysis for a particular use case. Further, a computing device implementing the machine learning techniques described herein may offer improved scaling to handle larger datasets and/or a variety of product types. Similarly, by training and re-training a machine learning model as described herein, such a computing device implementing such techniques may offer continuous improvements by training a machine learning model on historical data and newly determined data alike, overall improving the quality and ability to comply to standards of the products in question.

As used herein, the term "product test" may refer to any standard, certification, test, or the like that is created or specified by an entity, agency, governing body, or the like, where each product test may be applicable to a certain type, kind, size, or portion of physical product that may be used in various applications (e.g., construction, consumer goods, manufacturing, maintenance, etc.).

The systems and methods discussed herein address a challenge that is particular to product design and manufacture. In particular, the challenge relates to a difficulty in accurately and effectively assessing whether a given product will comply with one or more applicable product tests or certifications. Conventionally, companies need to manufacture large amounts of product samples that meet certain stringent requirements for the applicable product tests or certifications, which can be expensive and discourage the production of different samples. The systems and methods offer improved capabilities to solve these problems by using data associated with alternative product tests that test easier-manufactured (e.g., smaller batch) product samples, and applying a machine learning model to the data to predict whether a compliant sample of the product would pass the applicable product test and/or requirements for a particular product category. Further, because the systems and methods employ communication between and among multiple devices, the systems and methods are necessarily rooted in computer technology in order to overcome the noted shortcomings that specifically arise in the realm of product design and manufacture.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103. Each of the electronic devices 101, 102, 103 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102, 103 may be an electronic device associated with an entity such as a company, business, corporation, or the like (e.g., a server computer or machine).

The electronic devices 101, 102, 103 may communicate with a server computer 115 via one or more networks 110. In embodiments, the network(s) 110 may support any type of data communication via any standard or technology (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). The server computer 115 may be associated with an entity such as a company, business, corporation, or the like, which designs, markets, manufactures, or sells products, or is otherwise involved in the supply chains of the products. The server computer 115 may include various components that support communication with the electronic devices 101, 102, 103.

The server computer 115 may communicate with one or more data sources 106 via the network(s) 110. In embodiments, the data source(s) 106 may compile, store, or otherwise access information associated with product tests, standards, certifications, requirements, and/or the like. In particular, the data source(s) 106 may represent certification entities, governing bodies, and/or the like, and may provide data, to the server computer 115, indicative of or representing various product tests, certifications, or the like. For example, one of the data sources 106 may represent the NFPA and may provide, to the server computer 115, data associated with a large-scale product test for a standard such as NFPA 262 or other NFPA standards. As another example, one of the data sources 106 may represent the CPR and may provide, to the server computer 115, data associated with a large-scale product test for a standard such as EN 50399 and/or other CPR standards.

According to embodiments, the server computer 115 may review or analyze data received from the data source(s) 106 to determine requirements associated with particular product tests or standards. For example, the server computer 115 may review information associated with a large-scale product test utilized for EN 50399 or an equivalent CPR standard and determine that a given cable specimen complies with the standard in question if the server computer 115 predicts a maximum flame spread distance (FSD) of 1.5 m (approximately 5 ft) or less, a total heat release of 15 MJ or less, a peak heat release rate of 30 kW or less, and a fire growth rate index of 150 W/s or less.

Additionally, the server computer 116 may receive or access a training dataset 116 that indicates a set(s) of results associated with a set(s) of product tests. For example, the training dataset 116 may indicate (i) a first set of results of a first set of products tested according to a large-scale product test and (ii) a second set of results of a second set of products tested according to a small-scale fire test. According to embodiments, the training dataset 116 may indicate characteristics, dimensions, materials, compositions, and/or qualities of the tested products, as well as any output(s) or result(s) of the applicable product test on a given product. For example, the portion of the training dataset 116 for the large-scale product test may include dimensions and compositions of the tested product specimens, as well as (i) a flame spread in meters in the large-scale product test, (ii) a total heat release in megajoules (MJ) in the large-scale product test, (iii) a peak heat release rate in kilowatts (kW) in the large-scale product test, and (iv) a fire growth rate index in watts per second (W/s) in the large-scale product test (i.e., the test outputs) for each product specimen as tested, as well as an indication of whether each tested product specimen complies with the relevant standard. Similarly, the portion of the training dataset 116 for the small-scale fire test may include dimensions and compositions of the tested product specimens, as well as a test output for each product specimen as tested. It should be appreciated that the server computer 115 may receive the training dataset 116 from one of the data sources 106 or from another source. In an embodiment, the training dataset 116 may include a set of results of a set of products tested according to only the large-scale product test.

According to embodiments, the server computer 115 may employ various machine learning techniques, calculations, algorithms, and the like to generate, train, and/or update a set of machine learning models associated with a set of particular product tests. In particular, the server computer 115 may initially train a machine learning model for a given product test(s) using data included in the training dataset 116 that indicates a set of results of product specimens that are tested according to the given product test(s). For example, the server computer 115 may generate a machine learning model associated with both a large-scale fire test and a small-scale fire test using a set of results of large-scale cables tested according to the large-scale product test used in associated with an appropriate standard and a set of results of small-scale cables tested according to the small-scale fire test. According to embodiments, the server computer 115 may apply or input a validation set into a set of generated machine learning models to determine which of the machine learning models is most accurate or otherwise may be used as the final or selected machine learning model.

According to embodiments, the server computer 115 may input a set of input data associated with a product into the generated machine learning model, a result of which may predict whether the product would comply with (i.e., pass) the applicable product test. The set of input data may originate from the electronic devices 101, 102, 103, or from another source (e.g., the data source 106). According to embodiments, a respective electronic device 102, 102, 103 may be operated by a user, and may generate or access a set of input data associated with a product that may be subject to a certain product test. The set of electronic devices 101, 102, 103 may transmit the set of input data to the server computer 115 via the network(s) 110.

Generally, the set of input data may be product test data different from the training dataset 116 that the server computer 115 used to train and/or update the machine learning model. In particular, the set of input data may be generated by a test different from the product test that is used to certify a given product. For example, the set of input data for a cable may be the result of a set of specimen cables tested using a small-scale test (e.g., a cone calorimeter). The set of input data may include at least a portion of the parameters or characteristics that are included in the training dataset 116 (e.g., product characteristics, dimensions, materials, compositions, and/or qualities, and any output(s) of the product test on a given product).

After receipt of the set of input data, the server computer 115 may use the set of input data as an input to the applicable machine learning model and may generate a set of outputs that may predict an output of a given product tested according to the product test used to certify the given product. According to embodiments, the set of outputs may align with the set of outputs for the product test. For example, a set of outputs generated using a machine learning model associated with EN 50399 may include, for a small-scale cable used to generate the set of inputs, the maximum peak optical density, the average optical density, and the maximum flame spread distance for the small-scale cable. Thus, the server computer 115 (or another component) may examine the set of outputs to predict into which category a product would fall and, subsequently, whether the product used to generate the set of inputs would pass the applicable product test.

In predicting into which category the product would fall, the server computer 115 may compare the output(s) to a respective set of values, thresholds, and/or the like that are specified for particular categories in association with the product test. For example, the server computer 115 may determine the flame spread distance, total heat release, peak heat release rate, and/or fire growth rate index using data gathered and output by the small-scale cable to determine in which category the product belongs, as specified by EN 50399.

The server computer 115 may be configured to interface with or support a memory or storage 113 capable of storing various data, such as in one or more databases or other forms of storage. In some implementations, the storage 113 may store data or information associated with the machine learning models that are generated by the server computer 115. Additionally, the server computer 115 may access the data associated with the stored machine learning models to input a set of inputs into the machine learning models.

Generally, a given small-scale test can assist the manufacturer in predicting the performance of the applicable products for the design considerations of the manufacturer, but may not replace the need for the applicable large-scale test. In particular, a manufacturer may need to perform a large-scale test for certification of a product under a given standard. However, by predicting the performance of the large-scale test, a manufacturer is able to determine whether to proceed to the large-scale test or save resources by performing further work on the product (e.g., if the prediction shows that the product will fail the test).

Although depicted as a single server computer 115 in FIG. 1A, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102, 103 interface with the server computer 115, the electronic devices 101, 102, 103 may actually interface with one or more of a number of distributed computers, servers, machines, or the like to facilitate the described functionalities.

Although three (3) electronic devices 101, 102, 103, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B illustrates an example environment 150 in which a product test platform 155 processes a set of input data 151 into product test predictor output data 152, according to embodiments. In some implementations, the set of input data 151 may be a training dataset (e.g., as described with regard to FIG. 1A above). The product test platform 155 may be implemented on any computing device, including the server computer 115 (or in some implementations, one or more of the electronic devices 101, 102, 103), as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. The computing device may further include various communication components (e.g., transceivers, ports, etc.) that may facilitate data communication with one or more additional computing devices.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as the Mezzanine bus).

The product test platform 155 may further include a user interface 153 configured to present content (e.g., the content of the input data 151 and information associated therewith). Additionally, a user may make selections to the content via the user interface 153, such as to navigate through different information, review certain input data, and/or other actions. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile media, as well as removable and non-removable media, implemented in any method or technology for storage of information such as computer-readable instructions, routines, applications (e.g., a product test predictor application 160), data structures, program modules, or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The product test platform 155 may operate in a networked environment and communicate with one or more remote platforms, such as a remote platform 165, via a network(s) 162, such as a local area network (LAN), a wide area network (WAN), telecommunications network, or other suitable network. The remote platform 165 may be implemented on any computing device, including one or more of the electronic devices 101, 102, 103, or the server computer 115 as discussed with respect to FIG. 1A, and may include many or all of the elements described above with respect to the platform 155. In some embodiments, as will be described herein, the product test predictor application 160 may be stored and executed by the remote platform 165 instead of by or in addition to the platform 155.

The product test predictor application 160 may employ machine learning techniques, such as, for example, a regression analysis (e.g., a logistic regression, linear regression, or polynomial regression), k-nearest neighbors, decisions trees, random forests, boosting, neural networks, support vector machines, deep learning, reinforcement learning, Bayesian networks, or the like. When the data 151 is a training dataset, the product test predictor application 160 may analyze/process the data 151 to train and/or update the machine learning model for storage as part of machine learning data 163 that may be stored in the memory 157.

When the data 151 comprises data associated with a product to be analyzed using the machine learning model (e.g., the machine learning model associated with a given product test to be applied to the product), the product test predictor application 160 may analyze or process the data 151 using the machine learning model to generate a set of output values. Depending on the implementation, the product test predictor application 160 may generate the set of output values including a determined category for the product (e.g., as an outcome of the given product test), one or more values used to generate the determined category, a confidence score associated with the determined outcome, etc. In some implementations, the product test predictor application 160 may add, to the machine learning model, additional product test results so that the product test predictor application 160 may use the updated machine learning model in subsequent input data analysis.

Generally, each of the data 151 and the data 152 may be embodied as any type of electronic document, file, template, etc., that may include various textual content and, for the data 152, a prediction of a product category and/or whether the product associated with the input data 151 would comply with the given product test based on the category, and may be stored in memory as program data in a hard disk drive, magnetic disk and/or optical disk drive in the product test platform 155 and/or the remote platform 165.

The product test predictor application 160 (or another component) may cause the product test predictor output data 152 (and, in some cases, the training or input data 151) to be displayed on the user interface 153 for review by the user of the product test platform 155. The user may select to review and/or modify the displayed data. For instance, the user may review the output data 152 to assess the product test compliance prediction associated with a given product.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Figure 2:
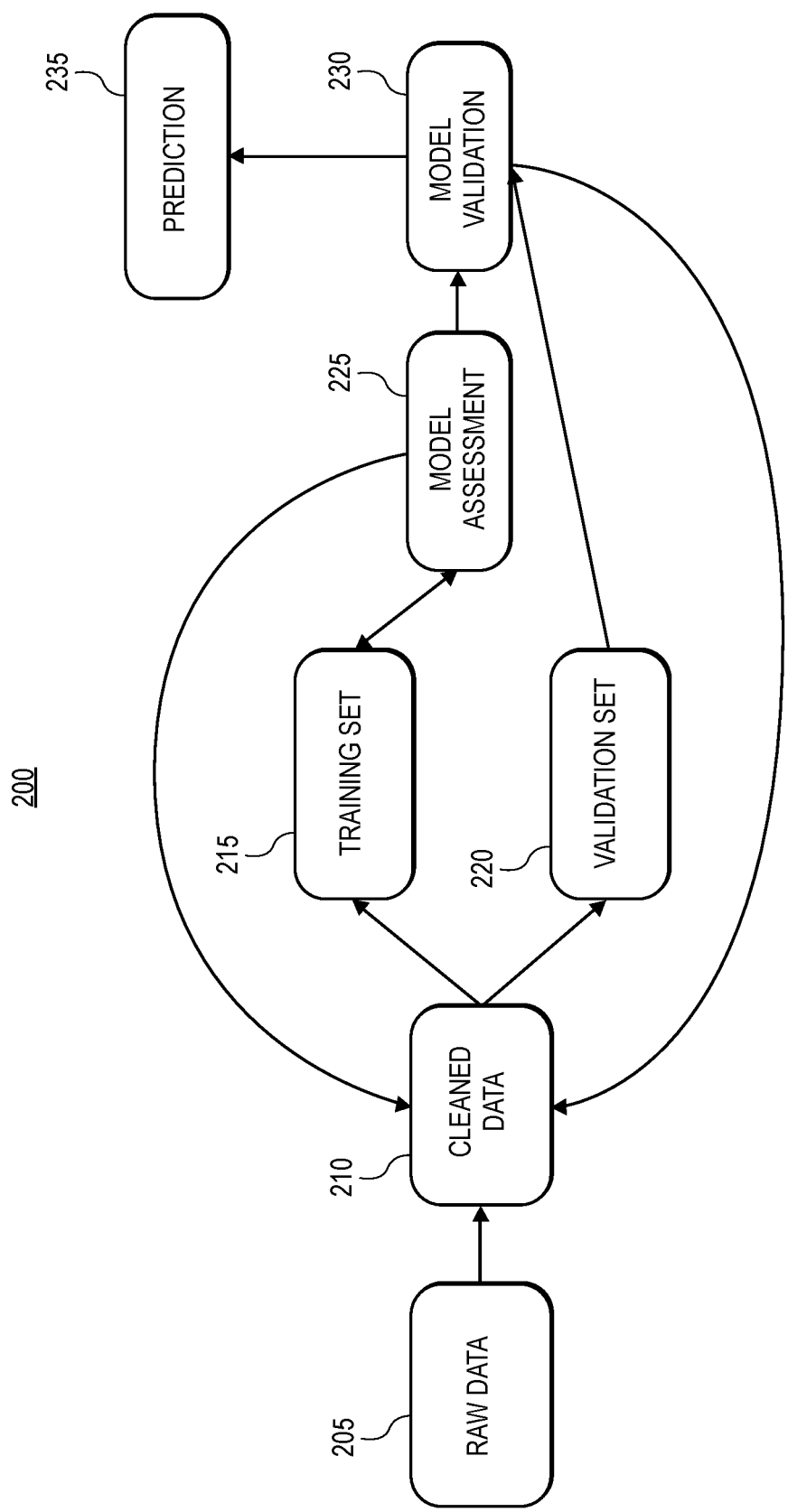
FIG. 2 depicts an illustration of an example flow associated with training certain machine learning functionalities, in accordance with some embodiments.

FIG. 2 illustrates an example flow 200 of various machine learning functionalities that may be employed by the systems and methods. The flow 200 includes a set of raw data 205 that may be a set of real-world data representing test results and parameters associated with a product test(s). In particular, the set of raw data 205 may identify products, characteristics of the products (e.g., physical dimensions), composition of the products (i.e., physical materials that make up the products), design of the products (i.e., information indicating how the products are structured), and/or similar information. The set of raw data 205 may further identify a set of results or outputs of an applicable large-scale product test and/or a small-scale product test. In particular, the set of outputs may be numeric and/or Boolean values or outputs indicating how a product performed in its large-scale product test or small-scale product test. In further implementations, the set of outputs may be strings and/or numeric or Boolean values indicating a particular category in which a product is predicted to belong.

For example, the EN 50399 test is a large-scale test to determine whether the cables comply with the flame spread and smoke generation requirements. Generally, a test chamber with a propane igniter, intake and exhaust ducts, and a means of regulating air flow through the chamber is used to test cable samples, as described with regard to the EN 50399 standard. Flame spread, heat release, and smoke production are monitored throughout the test.

The EN 50399 test produces at least four (4) outputs: a flame spread distance, a total heat release, a peak heat release rate, and a fire growth rate index. A given cable will be classified as one of $B1_{ca}$, $B2_{ca}$, $C_{ca}$, or $D_{ca}$ according to EN 50399 based on the four outputs. In particular, a cable is classified as belonging to the $B1_{ca}$ group when the flame spread is less than or equal to 1.75 m, the total heat release is less than or equal to 10 MJ, the peak heat release rate is less than or equal to 20 kW, and the fire growth rate index is less than or equal to 120 W/s. Similarly, a cable is classified as belonging to the $B2_{ca}$ group when the flame spread is less than or equal to 1.5 m, the total heat release is less than or equal to 15 MJ, the peak heat release rate is less than or equal to 30 kW, and the fire growth rate index is less than or equal to 150 W/s. Further, a cable is classified as belonging to the $C_{ca}$ group when the flame spread is less than or equal to 2.0 m, the total heat release is less than or equal to 30 MJ, the peak heat release rate is less than or equal to 60 kW, and the fire growth rate index is less than or equal to 300 W/s. Finally, a cable is classified as belonging to the $D_{ca}$ group when the total heat release is less than or equal to 70 MJ, the peak heat release rate is less than or equal to 400 kW, and the fire growth rate index is less than or equal to 1300 W/s, with no particular limit on the fire spread.

The set of raw data 205 associated with EN 50399 may, for each cable in the set of raw data 205, identify the cable (e.g., "Cable A"), and include data indicative of characteristics, composition, and design of the cable. Additionally, the set of raw data 205 may, for each cable in the set of raw data 205, include the flame spread distance, a total heat release, a peak heat release rate, and a fire growth rate index resulting from completion of the EN 50399 test, as well as indicate a category to which the particular cable belongs according to the EN 50399 test.

In some such examples, the set of raw data 205 may further include a set of results for small-scale cables tested according to a small-scale test (e.g., a test administered by a cone calorimeter). This portion of the set of raw data 305 may, for each small-scale cable tested according to the small-scale test, identify the cable (e.g., "Cable A"), and include data indicative of characteristics, composition, and design of the cable. Additionally, the set of raw data 205 may, for each small-scale cable, include various metrics and values associated with results of the small-scale test. For example, the set of raw data 205 may include a sample diameter, sample weight, weight loss during the test, peak heat release rate (HRR), total heat release (HR), peak smoke release rate (SRR), total smoke release (SR), and/or HRR average over a specific period of time (e.g., from 0-5 minutes, 5-10 minutes, 10-15 minutes, 0-10 minutes, 10-20 minutes, etc.).

An electronic device may clean the set of raw data 205 to remove incomplete data, conflicting data, erroneous data, and/or the like, and accordingly result in a set of cleaned data 210. According to some implementations, the electronic device may divide or segment the set of raw data 205 into a training set 215 and a validation set 220, where there may or may not be overlap between the training set 215 and the validation set 220. The electronic device may train and/or update, using the training set 215, a set of machine learning models, which may be represented by the model assessment 225 of FIG. 2. In further implementations, the electronic device may utilize, train, update, etc. any number of machine learning models of various types, for example a flat model, a hierarchical model, a network model, a relational model, an object-relational model, or other types of machine learning models.

Depending on the implementation, the electronic device may train the machine learning model(s) using supervised or unsupervised techniques. As such, in some implementations in which the electronic device uses supervised techniques, at least part of the raw data 205 may be labeled to indicate to the machine learning model the correct outcome. For example, a sample set of data regarding a cable may be labeled with an indication that the cable is a class $B1_{ca}$ product to facilitate training. In other implementations, the raw data 205 is not labeled, and the electronic device uses unsupervised training techniques to train the machine learning model.

In some implementations, the electronic device may train multiple machine learning models of different types. For example, the electronic device may train and/or use a random forest classification model as a first model to determine a predicted category grouping and/or confidence score associated with the predicted category grouping. Further, the electronic device may subsequently or simultaneously train and/or use one or more regression models (e.g., a regression model directed to each output value of the large-scale test) to determine a test profile comprising values associated with the output of the large-scale test and/or a predicted category grouping for the product.

The electronic device may apply or input the validation set 220 into each of the trained machine learning models, which may be represented by a model validation 230 of FIG. 2. In applying or inputting the validation set 220 into each of the created machine learning models, the electronic device may determine which of the machine learning models is most accurate or otherwise may be used as the final or selected machine learning model, which may be represented by a prediction 235 of FIG. 2. In particular, the prediction 235 may represent the selected machine learning model into which real-world data may be input, where the selected machine learning model may generate an output based on the trained and validated machine learning model.

Figure 3:
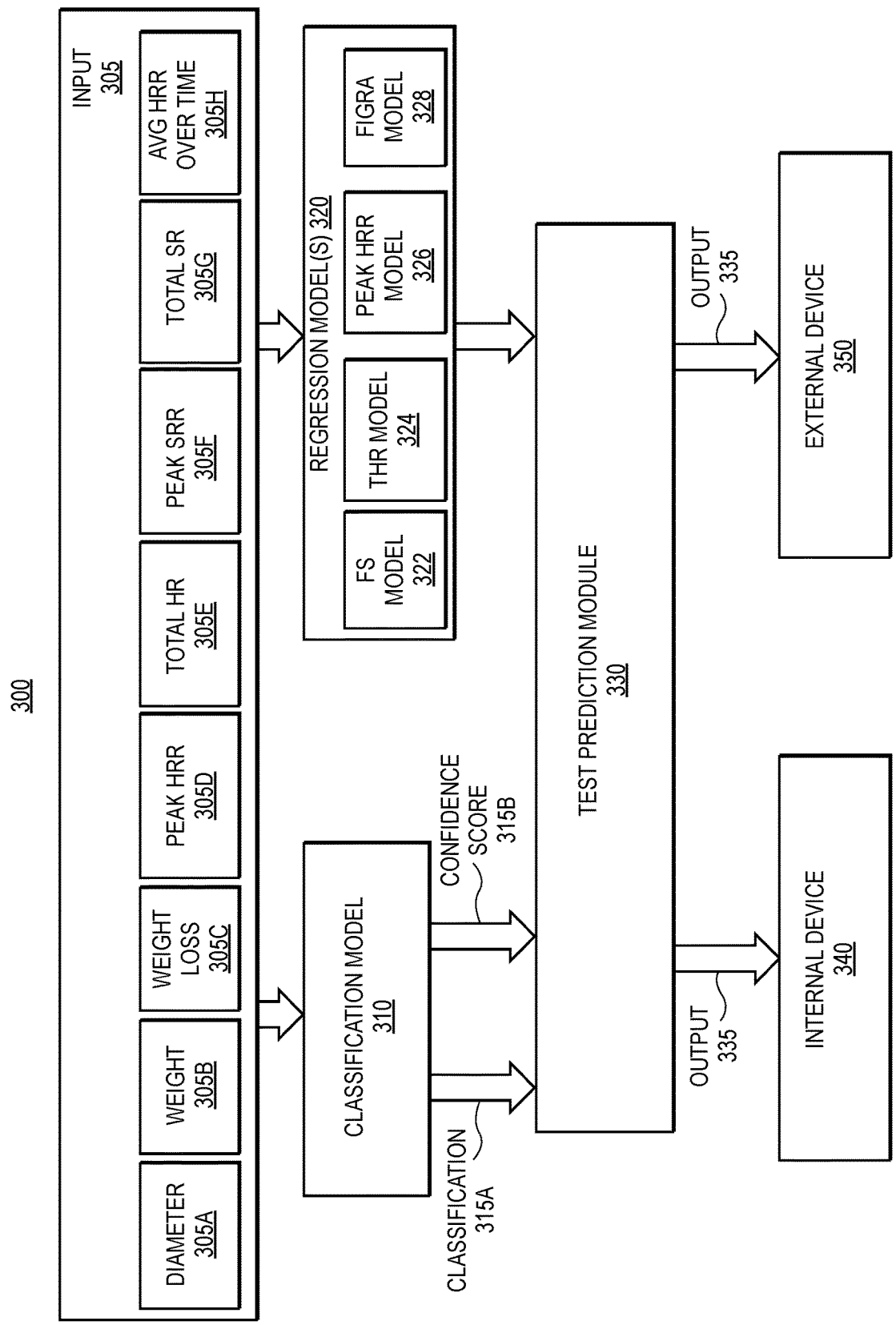
FIG. 3 depicts an example block diagram including inputs and outputs associated with an example set of machine learning models, in accordance with some embodiments.

FIG. 3 illustrates a block diagram 300 depicting inputs and outputs associated with a machine learning model. In particular, the diagram 300 includes a set of inputs 305 that represent parameters or outputs associated with a small-scale product test. For example, as shown in FIG. 3, the set of inputs 305 may be associated with a small-scale cable fire test, and may include the following inputs: diameter (m) 305A, weight (kg) 305B, weight loss (kg) 305C, peak HRR (kW/m$^2$) 305D, total HR (MJ) 305E, peak SRR (m$^2$/s) 305F, total SR (m$^2$) 305G, and average HRR over a particular time period (kW/m$^2$s) 305H. It should be appreciated that a given product may have its own set of inputs 305. It should be appreciated that the set of inputs 305 may vary depending on the type of product test, and that the particular inputs 305A-305H are exemplary and not limiting.

An electronic device (e.g., electronic device 101, 102, 103; server 115; etc.) may support a plurality of models into which the set of inputs 305 may be input for a particular product. In the exemplary implementation of FIG. 3, the plurality of models may include a classification model 310 and a set of regression models 320. Depending on the implementation, the classification model 310 and/or the set of regression models 320 may correspond to the prediction 235 as discussed with respect to FIG. 2. The electronic device may generate a set of outputs based on inputting the set of inputs 305 into the classification model 310 and/or at least one model of the set of regression models 320. Depending on the implementation, the set of regression models may include a fire spread (FS) model 322, a total heat release (THR) (or, in some implementations, a total heat release for a predetermined period of time (e.g., $THR_{1200s}$ for 1200 seconds)) model 324, a peak heat release rate (HRR) model 326, and/or a fire growth rate index (FIGRA) model 328. It will be understood that such models are exemplary, and that more, fewer, or alternate models may be utilized. In some implementations, the electronic device may analyze the set of outputs the predict how a large-scale version of the product would perform on the large-scale product test. In some such implementations, the classification model 310 generates a classification 315A (e.g., a category grouping, such as one of $B1_{ca}$, $B2_{ca}$, $C_{ca}$, or $D_{ca}$ according to the EN 50399 test), and the set of regression models 320 generates a similar classification 325. In further implementations the classification model 310 may further generate a confidence score 315B for the classification 315A. Similarly, each model of the set of regression models 320 may generate a particular value corresponding to the model in question that can be used to determine the classification 325 (e.g., the FS model 322 predicts an FS value, the THR model 324 predicts a THR value, the peak HRR model 326 predicts a peak HRR, and the FIGRA model 328 predicts a FIGRA value).

In some implementations, the electronic device uses the outputs of the classification model 310 (e.g., the classification 315A and confidence score 315B) and/or outputs of the set of regression models 320 (e.g., the classification 325 and/or calculated values of the set of models) as inputs to a test prediction module 330. The test prediction module 330 may use the classification 315A from the classification model 310 and the classification 325 from the set of regression models 320 to determine a prediction classification for the product as an output 335. In some implementations, the test prediction module 330 determines whether the classification 315A and the classification 325 match (e.g., denote the same category). In some such implementations, the test prediction module 330 provides an output 335 indicating whether the classifications 315A and 325 match or not.

In further implementations, the test prediction module 330 additionally or alternatively provides the individual classifications 315A and 325. In still further implementations, the test prediction module 330 additionally provides information associated with the classifications 315A and 325 in the outputs 335. For example, the outputs 335 may include individually predicted values in the profile generated by the set of regression models 320 and/or the confidence score 315B as generated by the classification model 310. In yet further implementations, the outputs 335 may additionally include any other such details associated with the classifications 315A and/or 325 as described herein.

Moreover, the test prediction module 330 may provide the output 335 to an internal device 340 and/or an external device 350. Depending on the implementation, the internal device 340 may be a device associated with the classification model 310 and/or set of regression models 320. For example, the internal device 340 may be the electronic device and/or be associated with the electronic device. In some such implementations, the internal device 340 may use the output 335 for training the classification model 310, set of regression models 320, test prediction module 330, and/or other various algorithms as described herein. The external device 350 may be a user device associated with an owner, designer, manufacturer, and/or other such individual associated with the product. Depending on the implementation, the external device 350 may display and/or otherwise convey the output 335 to the user. Additionally or alternatively, the external device 350 may determine and/or receive recommended actions for modifications to the product to meet the requirements for a given category.

Figure 4:
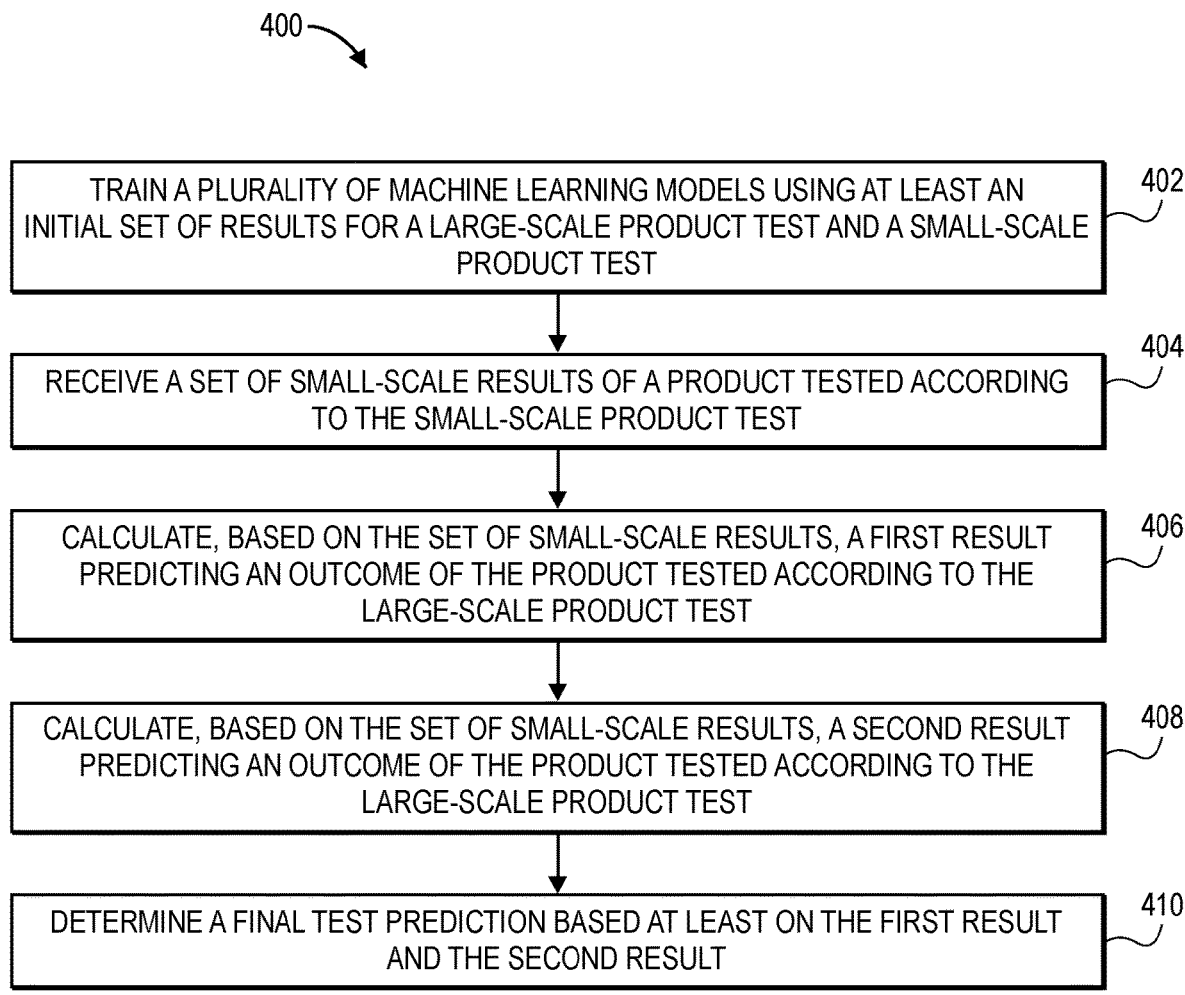
FIG. 4 is an example flowchart associated with predicting an outcome of a product test, in accordance with some embodiments.

FIG. 4 depicts is a block diagram of an example method 400 for predicting an outcome of a large-scale product test. The method 400 may be facilitated by an electronic device (such as the server computer 115 or components associated with the product test platform 155 as discussed with respect to FIGS. 1A and 1B) that may be in communication with additional devices or data sources.

At block 402, the electronic device may train a plurality of machine learning models. In some implementations, the electronic device may train the plurality of machine learning models using at least an initial set of results. Depending on the implementation, the initial set of results may be or include an initial set of results for an initial set of large-scale products tested according to a large-scale product test, an initial set of small-scale products tested according to a small-scale product test, etc. In some such implementations, the small-scale product test and the large-scale product test are a small-scale cable fire test (e.g., a CPR cable fire test for a small quantity of cable) and a large-scale cable fire test (e.g., a CPR cable fire test for a large quantity of cable). In further such implementations, the small-scale product test is administered by a fire and/or heat testing device (e.g., a calorimeter, a cone calorimeter, etc.). Depending on the implementation, the electronic device may train the plurality of machine learning models as described herein with regard to FIG. 2.

At block 404, the electronic device may receive a set of small-scale results of a product tested according to the small-scale product test. In some implementations, the small-scale product test may be representative of the large-scale product test, as described above. Depending on the implementation, the small-scale product test may include a plurality of determinations, calculations, and/or other such characteristics of the product being tested. For example, the results of the small-scale product test may include product characteristics such as (i) a sample diameter for the product, (ii) a sample weight for the product, (iii) weight loss, (iv) peak HRR, (v) total HR, (vi) peak SRR, (vii) total SR, (viii) HRR average from 0-5 minutes, (ix) HRR average from 5-10 minutes, (x) HRR average from 10-15 minutes, (xi) and/or any other similar data resulting from the small-scale product test.

At block 406, the electronic device may calculate, based on the set of small-scale results, a first result predicting an outcome of the product tested according to the large-scale product test. In particular, the electronic device may calculate the first result using a first machine learning model of a plurality of machine learning models, and by using the set of small-scale results as an input to the first machine learning model. In some implementations, the first machine learning model is a supervised machine learning model. For example, the first machine learning model may be a classification model such as a random forest model. Depending on the implementation, calculating the first result may include determining a first classification for the product and calculating a confidence value for the first classification. For example, the first classification may be a class $B1_{ca}$ product, a class $B2_{ca}$ product, a class $C_{ca}$ product, or a class $D_{ca}$ product. etc.

In particular, a cable is classified as belonging to the $B1_{ca}$ group when the flame spread is less than or equal to 1.75 m, the total heat release is less than or equal to 10 MJ, the peak heat release rate is less than or equal to 20 kW, and the fire growth rate index is less than or equal to 120 W/s. Similarly, a cable is classified as belonging to the $B2_{ca}$ group when the flame spread is less than or equal to 1.5 m, the total heat release is less than or equal to 15 MJ, the peak heat release rate is less than or equal to 30 kW, and the fire growth rate index is less than or equal to 150 W/s. Further, a cable is classified as belonging to the $C_{ca}$ group when the flame spread is less than or equal to 2.0 m, the total heat release is less than or equal to 30 MJ, the peak heat release rate is less than or equal to 60 kW, and the fire growth rate index is less than or equal to 300 W/s. Finally, a cable is classified as belonging to the $D_{ca}$ group when the total heat release is less than or equal to 70 MJ, the peak heat release rate is less than or equal to 400 kW, and the fire growth rate index is less than or equal to 1300 W/s, with no particular limit on the fire spread.

In some implementations, the first machine learning model calculates a confidence score indicative of a likelihood that the determination fits within a category. In further implementations, the first machine learning model can calculate the confidence score based on a historical sample of data points compared to the current data point(s). For example, if 100 previous data points look somewhat similar to the current data point (e.g., sharing a number of metrics or within a predetermined bounds in a number of metrics), then the first machine learning model may determine a reasonable confidence score (e.g., for a scale of 0-1, a confidence score of 0.5-0.75). As a further example, if the 100 previous data points match the current data point completely, then the first machine learning model may determine a high confidence score (e.g., 0.9-1.0).

In further implementations, the first machine learning model additionally or alternatively calculates an accuracy score based on overall performance on test data points. For example, if the first machine learning model is tested on 1000 test data points and accurately categorizes 950 of the test data points, the first machine learning model may return an accuracy score of 0.95 (e.g., 95%). Alternatively, the first machine learning model calculates the accuracy score based on performance of the model in analyzing test data points with similar characteristics. For example, if the first machine learning model is tested on 1000 test data points, 500 of which have input values similar to the current data point (e.g., within 5% of the values, within 10% of the values, within 15% of the values, etc.), and for which 450 of the 500 are accurate, the machine learning model may return an accuracy score of 0.9 (e.g., 90%). As a further alternative implementation, the first machine learning model may calculate the accuracy score based on similar determinations. For example, if the first machine learning model determines that the product is a class $B1_{ca}$ product, the first machine learning model may analyze a past accuracy of determinations made for the same class. As such, if the model is tested on 1000 data points and 200 are determined to be class $B1_{ca}$ products with 190 accurate determinations, the model may calculate the accuracy score to be 0.95 (e.g., 95%). Similarly, the first machine learning model may calculate the accuracy score according to other such techniques for performing such a calculation (e.g., with regard to a classifier model such as a random forest classifier).

At block 408, the electronic device may calculate, based on the set of small-scale results, a second result predicting an outcome of the product tested according to the large-scale product test. In particular, the electronic device may calculate the second result using at least one second machine learning model of a plurality of machine learning models, and by using the set of small-scale results as an input to the second machine learning model. In some implementations, the second machine learning model includes a plurality of machine learning models, such as regression models, directed to predicting a test profile comprised of particular predicted values of the large-scale test. In further such implementations, the second machine learning model may then determine a classification based on the outputs of the plurality of machine learning models for the values. For example, the regression models may be four lasso regression models for determining and/or predicting (i) a flame spread in meters in the large-scale product test (e.g., an FS model), (ii) a total heat release in megajoules (MJ) in the large-scale product test (e.g., a THR model), (iii) a peak heat release rate in kilowatts (kW) in the large-scale product test (e.g., a Peak HRR model), and (iv) a fire growth rate index in watts per second (W/s) in the large-scale product test (e.g., a FIGRA model). As such, the second machine learning model(s) may determine a second classification for the product and/or one or more predicted characteristic values for the large-scale product test.

At block 410, the electronic device may determine a final test for the product test. In particular, in some implementations, the electronic device may predict the outcome of the large-scale product test based at least on the first result and the second result. In some such implementations, the electronic device determines whether the first result and the second result include a matching (e.g., the same) determination regarding the determined class. For example, the electronic device may determine that the product is a class $C_{ca}$ product when both the first result and the second result indicate that the product is a class $C_{ca}$ product. In further implementations, the predicted outcome may indicate both the first result and the second result, along with an indication of whether the first result and the second result match. For example, if the first result indicates that the product is a class $C_{ca}$ product and the second result indicates that the product is a class $D_{ca}$ product, the predicted outcome may note that the models predict different outcomes, along with the first and second result.

In still further implementations, the predicted outcome may prioritize and/or weight one result over the other, and may similarly indicate whether the models match. For example, if the first result indicates that the product is a class $C_{ca}$ product and the second result indicates that the product is a class $D_{ca}$ product, then the predicted outcome may predict that the product is a class $C_{ca}$ product but further notes that the models do not agree. In yet still further implementations, the predicted outcome includes the first and second results, an indication of whether the results match, and further details regarding the results. For example, the predicted outcome may include the confidence level for the first result and the predicted characteristic values for the second result.

Depending on the implementation, the electronic device may transmit the predicted outcome, the first result, and/or the second result to a user device. For example, the user device may be a user device belonging to a third party (e.g., a customer, designer, manufacturer, and/or other such associated user of the product being tested). In some such examples, the user device may display the predicted outcome, the first result, and/or the second result to the third party. The third party is therefore made aware of the predicted outcome of the test, and is thus enabled to modify the product as necessary to change the predicted category and/or proceed with undergoing the large-scale product test. As a further example, the user device may be the electronic device and/or may be a user device associated with the electronic device. In some such examples, the user device updates (e.g., trains and/or retrains) the plurality of machine learning models using the outcome, the first result, and/or the second result.

Figure 5:
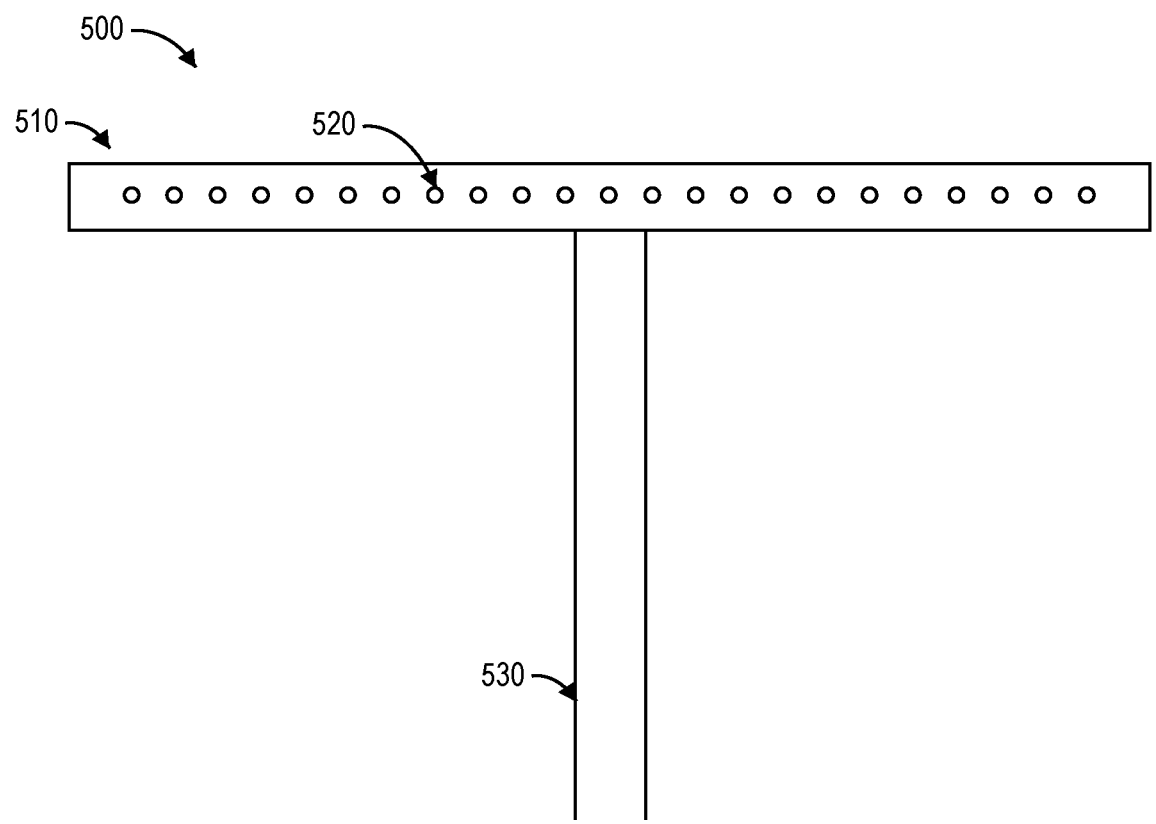
FIG. 5 depicts an exemplary schematic of an example ignition burner which may be used for small scale tests, in accordance with some embodiments.

FIG. 5 depicts an exemplary schematic of an example ignition burner 500 which may be used for small scale tests, in accordance with some embodiments. In particular the ignition burner 500 may include a crossbar 510 including one or more holes 520 to attempt to ignite material in a chamber. The crossbar 510 may be connected to a support beam 530 that connects via nozzle to a fuel and/or ignition source (not shown). Depending on the implementation, the ignition burner 500 may include an appropriate number of holes 520 (e.g., 1 hole, 5 holes, 10 holes, 20 holes, 23 holes, etc.). In some implementations, the holes may be equally spaced from one another (e.g., 0.1 inches apart, 0.2 inches apart, 0.5 inches apart, 1 inch apart, etc.). The first and last hole 520 may be equally spaced from the edges (e.g., 0.25 inches, 0.5 inches, 0.75 inches, 1 inch, etc.). Alternatively, the first and last hole 520 may be spaced in a pattern or irregularly spaced. The holes 520 may have a diameter of 0.01 inches, 0.0225 inches, 0.035 inches, 0.0475 inches, 0.06 inches, etc.

In some implementations, the crossbar 510 may be approximately 5 inches long, 6.125 inches long, 7.25 inches long, 9.5 inches long, etc. Similarly, the support beam 530 may be approximately 6 inches long, 12 inches long, 24 inches long, etc. Depending on the implementation, the crossbar 510 may be slightly more or less than half as long as the support beam 530 (e.g., 6.125 inches and 12 inches, 7.25 inches and 15 inches, etc.). Depending on the implementation, the crossbar 510 may be 0.13 inches wide, 0.26 inches wide, 0.39 inches wide, etc.

Figure 6A:
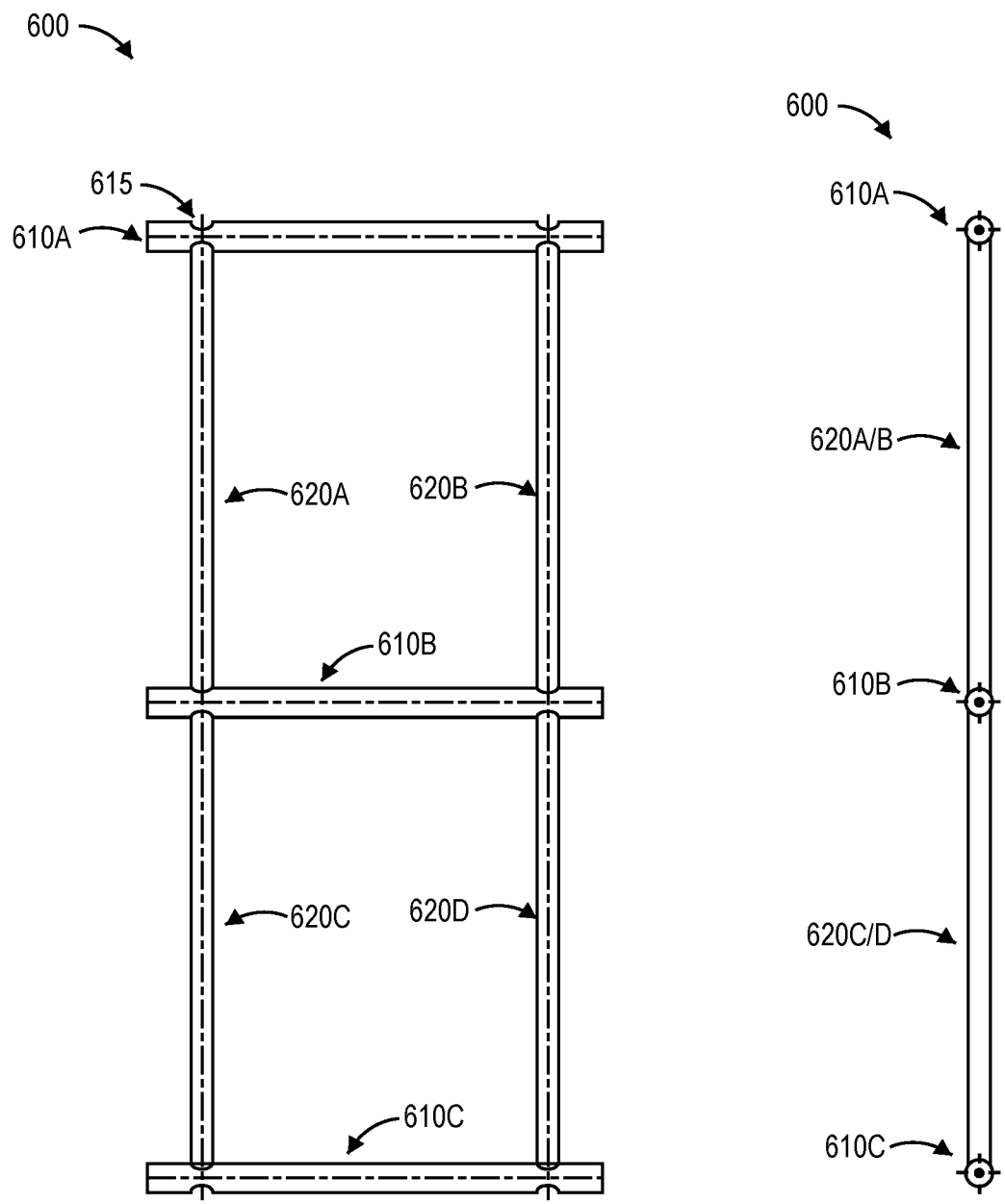
FIG. 6A depicts an exemplary schematic of an example small-scale ladder holder which may be used for small scale tests, in accordance with some embodiments.
Figure 6B:
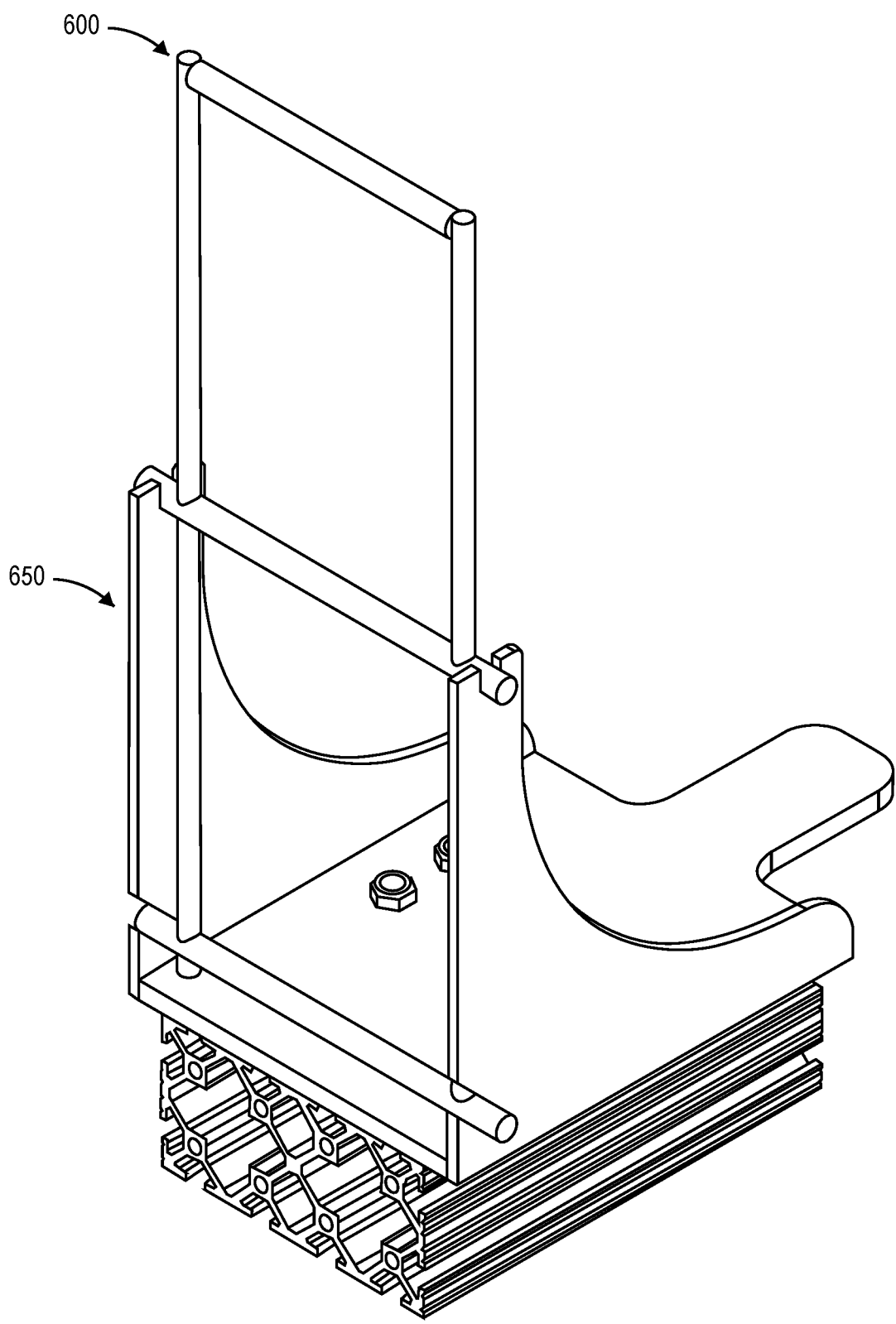
FIG. 6B depicts an isometric view of an example small-scale ladder holder which may be used for small scale tests, in accordance with some embodiments.
Figure 6C:
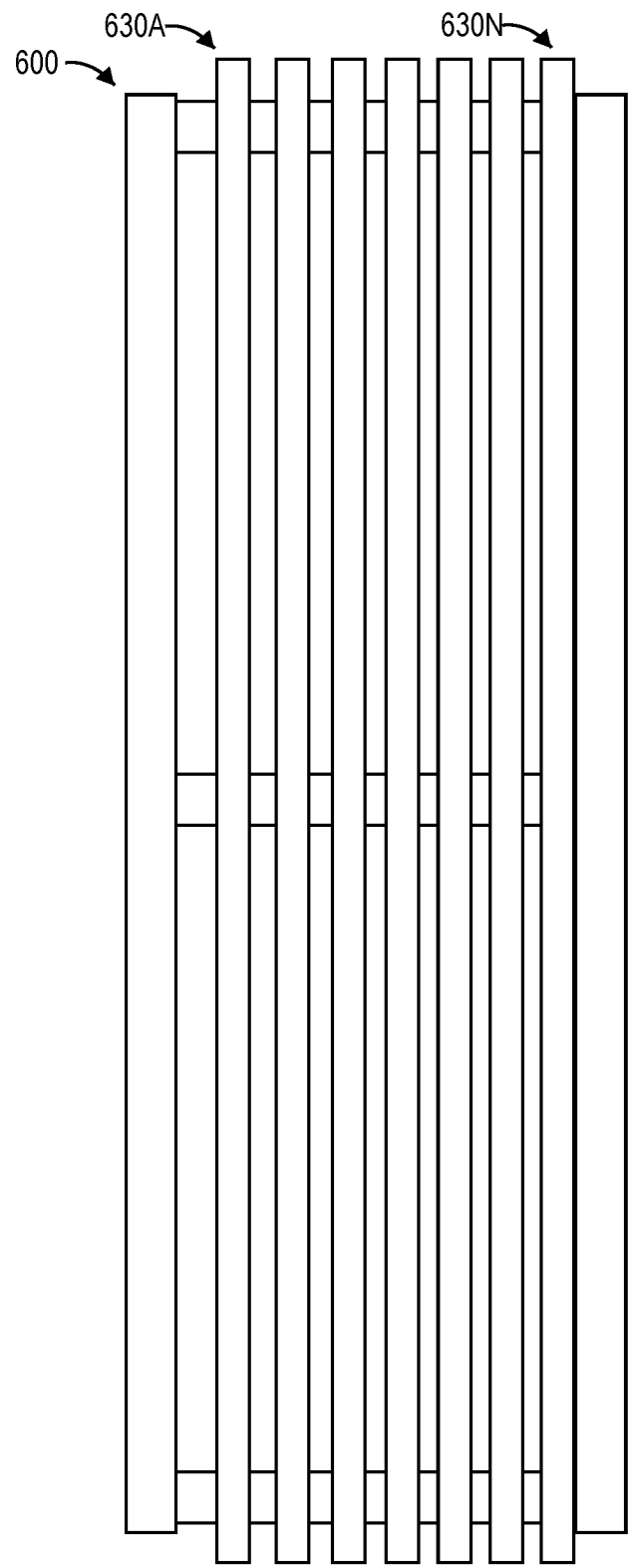
FIG. 6C depicts the example small-scale ladder holder of FIGS. 6A and 6B holding a sample for small scale tests, in accordance with some embodiments.

FIGS. 6A-6C illustrate a small-scale ladder holder 600. In particular, FIG. 6A illustrates a schematic view of the small-scale ladder holder 600 from a front and side perspective, FIG. 6B illustrates an isometric view of the small-scale ladder holder 600, and FIG. 6C illustrates a front perspective of the small-scale ladder holder 600 holding a sample (e.g., a cable sample) for a small-scale test.

The small-scale ladder holder 600 includes three horizontal rods 610 (e.g., rods 610A, 610B, and 610C), as well as four vertical rods 620 (e.g., rods 620A, 620B, 620C, and 620D). In some implementations, the vertical rods may be two vertical rods 620 separated by one of the horizontal rods 610 into four distinct segments (e.g., rods 620A, 620B, 620C, and 620D). Depending on the implementation, each horizontal rod 610 may include one or more openings 615 in which to insert the vertical rods 620. The openings 615 may pass through the entire horizontal rod 610, may pass partway through the horizontal rod 610, etc. Depending on the implementation, the openings may be on one side of the horizontal rods 610, both sides of each horizontal rod 610, both sides of some of the horizontal rods 610B and one side of others of the horizontal rods 610A and 610C, etc.

Depending on the implementation, each horizontal rod may be 3 inches, 6 inches, 12 inches, etc. The distance between the openings 615 may be 3 inches, 4.25 inches, 5.5 inches, etc. The horizontal rods 610 may have a width (by diameter) of 0.2 inches, 0.3125 inches, 0.425 inches, etc. The holes may have a diameter of approximately 0.125 inches, 0.25 inches, 0.375 inches, etc. As such, the vertical rods 620 may have a similar or slightly smaller width (by diameter). The distance between the outer edges of the holes may be 4.4 inches, 4.525 inches, 4.65 inches, etc. The distance between the inner edges of the holes may be 4.2 inches, 4.3 inches, 4.4 inches, etc. The length of the distinct segments for the vertical rods 620 (e.g., 620A, 620B, 620C, 620D, etc.) may be 5.3 inches, 5.4 inches, 5.5 inches, etc. As such, the total length of the vertical rods may be approximately 11.5 inches, 11.75 inches, 12 inches, etc.

The small-scale ladder holder 600 may be made of non-flammable material and/or material that is unlikely to ignite or melt below a predetermined temperature threshold. Similarly, the small-scale ladder holder 600 may be fit into a frame 650 made of similar material and/or material fitting to similar requirements as the small scale-ladder holder.

The small-scale ladder holder 600 is designed to hold samples 630A-630N (e.g., cable samples). Depending on the implementation, the small-scale ladder holder 600 may be designed to hold one sample, five samples, seven samples, twelves samples, twenty samples, and/or any other such number of samples for the small-scale test. The small-scale ladder holder 600 may include a full sample width, two sample widths, half a sample width, etc. between each sample. As such, the number of samples held by the small-scale ladder holder 600 may differ depending on the diameter of the samples as well as the size of the gap between each sample. In further implementations, the number of samples may be applied as described above for samples with a width above a predetermined threshold (e.g., 5 millimeters, 10 millimeters, 20 millimeters, etc.). For example, a cable of less than 5 millimeters may be mounted in bundles depending on the size of the cable (e.g., 4 per bundle, 10 per bundle, 20 per bundle, etc.) with a predetermined number of bundles depending on a size for the bundle (e.g., 15 bundles for 10 mm diameter bundles, 10 bundles for 15 mm diameter bundles, 5 bundles for 30 mm diameter bundles, etc.).

In some implementations, the small-scale test performed with the small-scale ladder holder 600 and the ignition burner 500 is or includes a cone calorimeter small-scale test. The cone calorimeter small-scale test is based on the principle that the amount of heat released from a burning sample is directly related to the amount of oxygen consumed during combustion. Depending on the implementation, the small-scale test may be a particular small scale test (e.g., the test method specified in the ASTM E 1354 standard) to test short lengths of cables to determine fire characteristics for such.

In some implementations, to analyze cable samples, the special fire dynamic caused by vertical flame propagation for an equivalent large-scale test should be taken into consideration. In particular, in some implementations, while conducting large-scale tests, the cable sample at the upper location in the chamber receives radiated heat from both the burner and the burning of the cable at the lower position. Conventional sample holders (e.g., as specified in the ASTM E 1345) standard are not suitable to replicate the fire dynamic in question. The small-scale ladder holder 600 is a small-scale ladder holder designed to secure longer cable lengths in a vertical direction in line with the fire dynamic. In further implementations, an ignition burner 500 is positioned at the bottom of the sample to test the samples (e.g., riser and CPR cables).

In some implementations, the ignition burner 500 is positioned lower than the cone bottom edge (not shown) (e.g., 0.125 inches, 0.25 inches, 0.375 inches, etc.), and the burner holes 520 face the sample horizontally. Depending on the implementation, the distance between the ignition burner 500 face and the sample front surface is 0.25 inches, 0.5 inches, 0.75 inches, 1 inch, etc.

In some implementations, the small-scale test includes a combination of an ignition burner 500 and a cone heater output (not shown), which simulates the thermal environment that cable samples can experience between 4 ft to 6 ft inside a riser chamber of a large-scale test. In further implementations, the cone calorimeter (e.g., in an entirety or individual components) is calibrated according to one or more calibration techniques, such as C-factor calibration, PMMA calibration, daily gas analyzer and smoke system calibration, etc. Depending on the implementation, C-factor calibration, includes burning methane gas to correct the gas analyzer readings and PMMA calibration includes burning a polymethyl methacrylate sample under the cone to check consistency of instrument outputs.

In some implementations, the heat flux for the small-scale test may vary depending on the large scale test to be performed (e.g., 25 kW/m^2 for UL 1666 samples, 40 kW/m^2 for EN 50399 samples, etc.). The ignition burner 500 may be supplied with 1.9 SLPM via a gas controller (not shown). Depending on the implementation, a monitor and/or user ensures that the ignition burner 500 maintains a distance from the sample (e.g., according to a metal ruler in the chamber after each test begins).

Depending on the implementation, the small-scale test may be for 5 minutes, 10 minutes, 15 minutes, or any other length of time (e.g., according to a predetermined threshold, according to a standard, etc.). A computing device in a system (e.g., system 100) may record the ignition and flame out timing during the predetermined time period. If the sample does not ignite (e.g., no sustained flaming observed) during the initial time period, the system 100 may (e.g., automatically or in response to a command from a user) extend the test duration to 30 mins. In further implementations, a user or the system 100 records a sample description and notes the extension in such. The sample description may be or include at least one of a project number, flame length, number of cable lengths applied on the small-scale ladder holder 600, heat input, etc. When the test is completed, the sample is moved to a scale for measurement carefully to prevent any loss of char.

It will be understood that each measurement described above with regard to FIGS. 5-6C are exemplary approximations only and should therefore not be considered to be limiting. Instead, the measurements described should be representative of potential examples as illustrative of potential example devices. Larger, smaller, and different proportioned versions of the device(s) should be understood to be envisioned.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method for predicting an outcome of a large-scale product test, the computer-implemented method comprising:
   receiving, by one or more processors, a set of small-scale results of a product tested according to a small-scale product test representative of the large-scale product test;
   calculating, by the one or more processors and based on the set of small-scale results as a first input to a first machine learning model of a plurality of machine learning models, a first result predicting an outcome of the product tested according to the large-scale product test, wherein calculating the first result includes:
   determining, by the one or more processors, a first classification for the product, and
   calculating, by the one or more processors, a confidence value for the first classification;
   calculating, by the one or more processors and based on the set of small-scale results as a second input to at least one second machine learning model of the plurality of machine learning models, a second result predicting the outcome of the product tested according to the large-scale product test, wherein calculating the second result includes:
   determining, by the one or more processors and based on a test profile for the large-scale product test, a second classification for the product, wherein determining the second classification includes:
   predicting, by the one or more processors and based on the set of small-scale results as the second input to the at least one second machine learning model of the plurality of machine learning models, the test profile, wherein:
   the at least one second machine learning model includes a plurality of regression models, and
   each regression model of the plurality of regression models predicts a test value of a plurality of test values of the test profile, the plurality of test values including at least one of: (i) a flame spread value; (ii) a total heat release value; (iii) a peak heat release rate value; and (iv) a fire growth rate index value; and
   predicting, by the one or more processors, an outcome of the large-scale product test based at least on the first result and the second result.

2. The computer-implemented method of claim 1, wherein the small-scale product test is administered by a cone calorimeter.

3. The computer-implemented method of claim 1, further comprising:
   transmitting, by the one or more processors, the outcome, the first result, and the second result to a user device; and
   updating, by the one or more processors, the plurality of machine learning models using the outcome, the first result, and the second result.

4. The computer-implemented method of claim 1, further comprising:
   training, by the one or more processors, the plurality of machine learning models using an initial dataset indicating at least an initial set of results of (i) an initial set of large-scale products tested according to the large-scale product test, and (ii) an initial set of small-scale products tested according to the small-scale product test.

5. A system for predicting an outcome of a large-scale product test, the system comprising:
one or more processors;
a memory storing data associated with a plurality of machine learning models; and
a non-transitory computer-readable memory interfaced with the one or more processors, and storing instructions thereon that, when executed by the one or more processors, cause the one or more processors to:
receive a set of small-scale results of a product tested according to a small-scale product test representative of the large-scale product test,
calculate, based on the set of small-scale results as a first input to a first machine learning model of a plurality of machine learning models, a first result predicting an outcome of the product tested according to the large-scale product test, wherein calculating the first result includes:
determining a first classification for the product, and
calculating a confidence value for the first classification,
calculate, based on the set of small-scale results as a second input to at least one second machine learning model of the plurality of machine learning models, a second result predicting the outcome of the product tested according to the large-scale product test, wherein calculating the second result includes:
determining, based on a test profile for the large-scale product test, a second classification for the product, wherein determining the second classification includes:
predicting, by the one or more processors and based on the set of small-scale results as the second input to the at least one second machine learning model of the plurality of machine learning models, the test profile, wherein:
the at least one second machine learning model includes a plurality of regression models, and
each regression model of the plurality of regression models predicts a test value of a plurality of test values of the test profile, the plurality of test values including at least one of: (i) a flame spread value; (ii) a total heat release value; (iii) a peak heat release rate value; and (iv) a fire growth rate index value, and
predict an outcome of the large-scale product test based at least on the first classification, the confidence value, and the second classification.

6. The system of claim 5, wherein the small-scale product test is administered by a cone calorimeter.

7. The system of claim 5, wherein the non-transitory computer-readable memory stores additional instructions thereon that, when executed by the one or more processors, further cause the one or more processors to:
transmit the outcome, the first result, and the second result to a user device; and
train the plurality of machine learning models using the outcome, the first result, and the second result.

8. The system of claim 5, wherein the non-transitory computer-readable memory stores additional instructions thereon that, when executed by the one or more processors, further cause the one or more processors to:
train the plurality of machine learning models using an initial dataset indicating at least an initial set of results of (i) an initial set of large-scale products tested according to the large-scale product test, and (ii) an initial set of small-scale products tested according to the small-scale product test.

9. A non-transitory computer-readable memory storing one or more instructions for predicting an outcome of a large-scale product test that, when executed by one or more processors, cause the one or more processors to:
receive a set of small-scale results of a product tested according to a small-scale product test representative of the large-scale product test;
calculate, based on the set of small-scale results as a first input to a first machine learning model of a plurality of machine learning models, a first result predicting an outcome of the product tested according to the large-scale product test, wherein calculating the first result includes:
determining a first classification for the product, and
calculating a confidence value for the first classification;
calculate, based on the set of small-scale results as a second input to at least one second machine learning model of the plurality of machine learning models, a second result predicting the outcome of the product tested according to the large-scale product test, wherein calculating the second result includes:
determining, based on a test profile for the large-scale product test, a second classification for the product, wherein determining the second classification includes:
predicting, by the one or more processors and based on the set of small-scale results as the second input to the at least one second machine learning model of the plurality of machine learning models, the test profile, wherein:
the at least one second machine learning model includes a plurality of regression models, and
each regression model of the plurality of regression models predicts a test value of a plurality of test values of the test profile, the plurality of test values including at least one of: (i) a flame spread value; (ii) a total heat release value; (iii) a peak heat release rate value; and (iv) a fire growth rate index value; and
predict an outcome of the large-scale product test based at least on the first classification, the confidence value, and the second classification.

10. The non-transitory computer-readable memory of claim 9, wherein the small-scale product test is administered by a cone calorimeter.

11. The non-transitory computer-readable memory of claim 9, wherein the instructions further include additional instructions that, when executed by the one or more processors, cause the one or more processors to:
transmit the outcome, the first result, and the second result to a user device; and
train the plurality of machine learning models using the outcome, the first result, and the second result.

* * * * *